United States Patent
Kamikihara et al.

(10) Patent No.: US 12,355,292 B2
(45) Date of Patent: Jul. 8, 2025

(54) VEHICLE AND CHARGING METHOD OF VEHICLE

(71) Applicant: TOYOTA JIDOSHA KABUSHIKI KAISHA, Toyota (JP)

(72) Inventors: Daisuke Kamikihara, Toyota (JP); Tomoya Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 587 days.

(21) Appl. No.: 17/876,066

(22) Filed: Jul. 28, 2022

(65) Prior Publication Data

US 2023/0095211 A1 Mar. 30, 2023

(30) Foreign Application Priority Data

Sep. 24, 2021 (JP) .................. 2021-155146

(51) Int. Cl.
*H02J 7/00* (2006.01)
*B60L 53/62* (2019.01)

(52) U.S. Cl.
CPC ........ *H02J 7/007192* (2020.01); *B60L 53/62* (2019.02); *H02J 7/00309* (2020.01)

(58) Field of Classification Search
USPC ....................................................... 320/109
See application file for complete search history.

(56) References Cited

U.S. PATENT DOCUMENTS

| 10,065,526 B2 | 9/2018 | Hare et al. |
| 2014/0042968 A1* | 2/2014 | Hiroe ............... B60L 53/665 320/109 |
| 2014/0266071 A1* | 9/2014 | Tomiyasu ......... H02J 7/007192 320/150 |
| 2019/0030983 A1 | 1/2019 | Miller et al. |

FOREIGN PATENT DOCUMENTS

| JP | 2015-171208 A | 9/2015 |
| WO | 2012/144060 A1 | 10/2012 |

\* cited by examiner

*Primary Examiner* — Samuel Berhanu
(74) *Attorney, Agent, or Firm* — Dinsmore & Shohl LLP (57) ABSTRACT

A vehicle includes an electrical component electrically connected to a transmission path of supply electric power, a temperature sensor configured to detect a temperature of the electrical component, a control device configured to suppress the supply electric power when the temperature detected by the temperature sensor is equal to or higher than a threshold temperature, as compared with a case where the temperature detected by the temperature sensor is lower than the threshold temperature. The control device is configured to lower the threshold temperature when the external charging is executed again after the external charging is stopped, as compared with a case before the external charging is stopped.

8 Claims, 7 Drawing Sheets

VEHICLE AND CHARGING METHOD OF VEHICLE

CROSS-REFERENCE TO RELATED APPLICATION

This application claims priority to Japanese Patent Application No. 2021-155146 filed on Sep. 24, 2021, incorporated herein by reference in its entirety.

BACKGROUND

1. Technical Field

The present disclosure relates to a vehicle and a charging method of the vehicle.

2. Description of Related Art

A vehicle in which a battery is mounted is becoming more widespread. Accordingly, various methods related to "external charging" have been proposed in which an in-vehicle battery is charged by the supply electric power from charging equipment. The vehicle disclosed in WO 2012/144060 is configured to strictly limit the electric power charged and discharged to the battery in response to a rise in a battery temperature when the battery temperature exceeds a predetermined temperature. A control device controls a charger so that charging is executed at a charging rate determined based on the temperature difference between the predetermined temperature and the battery temperature.

SUMMARY

An electrical component such as a relay and an inlet is electrically connected to a transmission path of the supply electric power from the charging equipment. The temperature of the electrical component can rise due to Joule heat during the external charging. Therefore, the electrical component needs to be protected from a failure due to overheating.

When the external charging is stopped, the temperature of the electrical component lowers. After the external charging is stopped, there is a case where the external charging is executed again (or restarted) in a short time. In that case, the temperature of the electrical component starts to rise again although the temperature of the electrical component does not sufficiently lower. Then, there is a possibility that the electrical component cannot be appropriately protected.

The present disclosure provides a vehicle that appropriately protects an electrical component from a temperature rise due to external charging and a charging method of the vehicle.

A vehicle according to a first aspect of the present disclosure is configured to execute external charging that charges an in-vehicle power storage device with supply electric power from charging equipment. The vehicle includes an electrical component electrically connected to a transmission path of the supply electric power, a temperature sensor configured to detect a temperature of the electrical component, and a control device configured to suppress the supply electric power when the temperature detected by the temperature sensor is equal to or higher than a threshold temperature, as compared with a case where the temperature detected by the temperature sensor is lower than the threshold temperature. The control device is configured to lower the threshold temperature when the external charging is executed again after the external charging is stopped, as compared with a case before the external charging is stopped.

In a first aspect of the present disclosure, the control device is configured to lower the threshold temperature when the external charging is executed again after the external charging is stopped, as compared with the case before the external charging is stopped. As a result, the time until the temperature detected by the temperature sensor reaches the threshold temperature is shortened as compared with a case where the threshold temperature is not set low (for example, when the threshold temperature is constant), and thus the supply electric power from the charging equipment is suppressed early. As a result, the temperature rise of the electrical component is suppressed. Therefore, according to the first aspect of the present disclosure, the electrical component can be appropriately protected from the temperature rise due to the external charging.

In the first aspect of the present disclosure, the control device may be configured to raise the threshold temperature until the threshold temperature reaches a value before the stop of the external charging after lowering the threshold temperature.

According to the first aspect of the present disclosure, the control device raises the threshold temperature until the threshold temperature reaches the value before the stop of external charging (that is, returns to the original value). As a result, when a sufficient time has passed after the restart of the external charging, the electrical component can be appropriately protected as in the case before the stop of the external charging.

In the first aspect of the present disclosure, the control device may be configured to raise the threshold temperature as time elapses after the supply electric power falls below a predetermined value.

In the first aspect of the present disclosure, the control device may be configured to raise the threshold temperature as time elapses from when the external charging is stopped.

According to the first aspect of the present disclosure, when the temperature detected by the temperature sensor reaches the threshold temperature too early, the supply electric power from the charging equipment is unnecessarily suppressed, and there is a possibility that the time needed for the external charging becomes long. On the other hand, in the first aspect of the present disclosure, the control device gradually raises the threshold temperature with the lapse of time after the supply electric power falls below a predetermined value (in short, from when the external charging is stopped). As a result, the temperature detected by the temperature sensor is suppressed from reaching the threshold temperature too early. As a result, the external charging from being prolonged can be prevented.

In the first aspect of the present disclosure, as a temperature difference between the temperature detected by the temperature sensor and a temperature of a portion of the electrical component, which is not detected by the temperature sensor, becomes larger, a lowering amount of the threshold temperature at the time when the external charging is stopped may become larger.

According to the first aspect of the present disclosure, as a temperature difference between a temperature of a portion detected by the temperature sensor and the temperature of the portion of the electrical component, which is not detected by the temperature sensor, (in other words, the non-uniformity of the temperature) becomes larger, the threshold temperature is more largely reduced. As a result, even a portion that is not detected by the temperature sensor can be more reliably protected from the temperature rise due to the external charging.

In the first aspect of the present disclosure, the electrical component may include charging relays configured to cut off the supply electric power according to a command by the control device.

In the first aspect of the present disclosure, the electrical component may include an inlet to which a charging cable extending from the charging equipment is connected.

A second aspect of the present disclosure is a charging method of a vehicle. The vehicle is configured to execute external charging of an in-vehicle battery with supply electric power from charging equipment and includes a control device. The charging method includes as a detection step, detecting a temperature of an electrical component electrically connected to a transmission path of the supply electric power in the vehicle by the control device, suppressing the supply electric power by the control device when the temperature detected in the detection step exceeds a threshold temperature, as compared with a case where the temperature detected in the detection step is lower than the threshold temperature, and lowering the threshold temperature by the control device when the external charging is executed again after the external charging is stopped, as compared with a case before the external charging is stopped.

According to the second aspect of the present disclosure, in the same manner as the first aspect of the present disclosure, the electrical component can be appropriately protected from the temperature rise due to the external charging.

According to the aspects of the present disclosure, the electrical component can be appropriately protected from the temperature rise due to the external charging.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings. The same or corresponding parts in the drawings are designated by the same reference numerals, and the description thereof will not be repeated.

EMBODIMENT

Overall Configuration of Charging System

Figure 1:
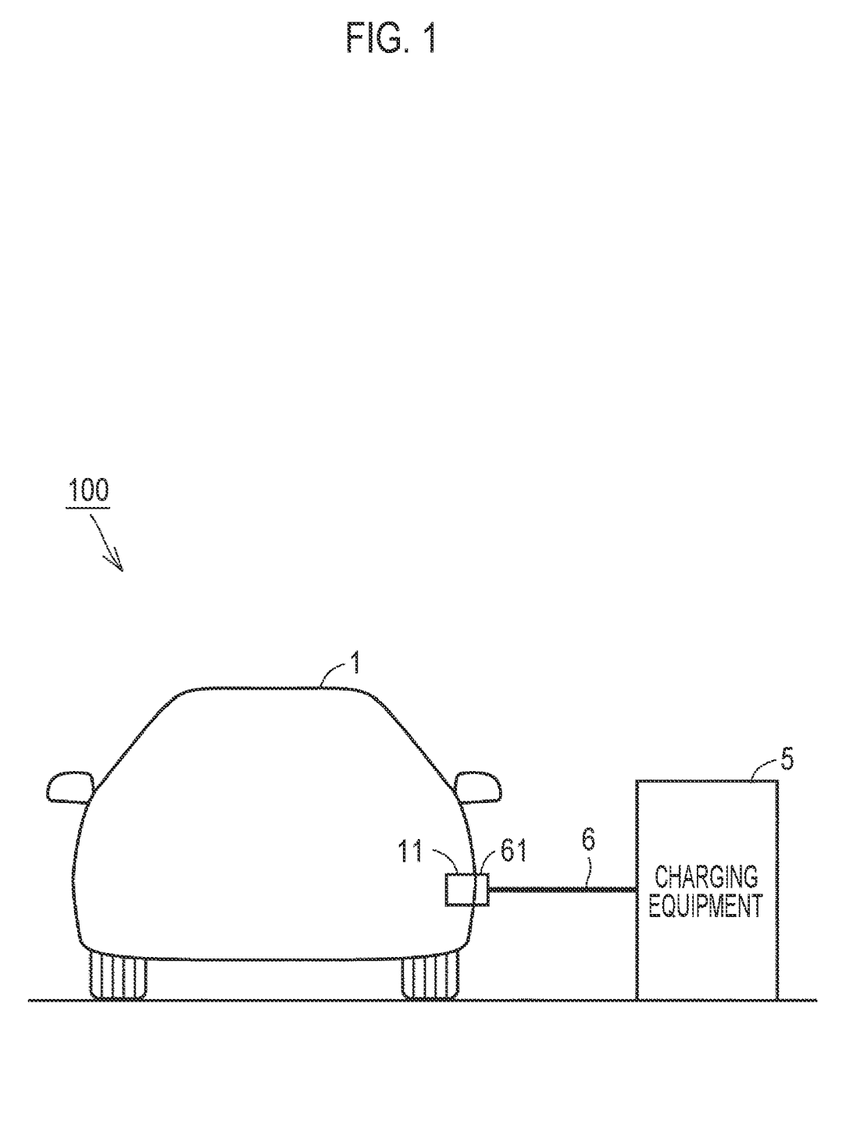
FIG. 1 is a diagram schematically showing an overall configuration of a charging system according to an embodiment of the present disclosure.

FIG. 1 is a diagram schematically showing an overall configuration of a charging system according to an embodiment of the present disclosure. A charging system 100 includes a vehicle 1, charging equipment 5, and a charging cable 6. FIG. 1 shows a situation at the time of external charging (so-called at the time of plug-in charging) in which electric power is supplied from the charging equipment 5 to the vehicle 1 via the charging cable 6.

The vehicle 1 is, for example, a battery electric vehicle (BEV). Note that, the vehicle 1 may be, for example, a plug-in hybrid electric vehicle (PHEV) as long as the vehicle 1 is a vehicle configured to execute the external charging.

The charging equipment 5 is, for example, a charger provided in a public charging point (also referred to as a charging station or a charging spot).

Figure 2:
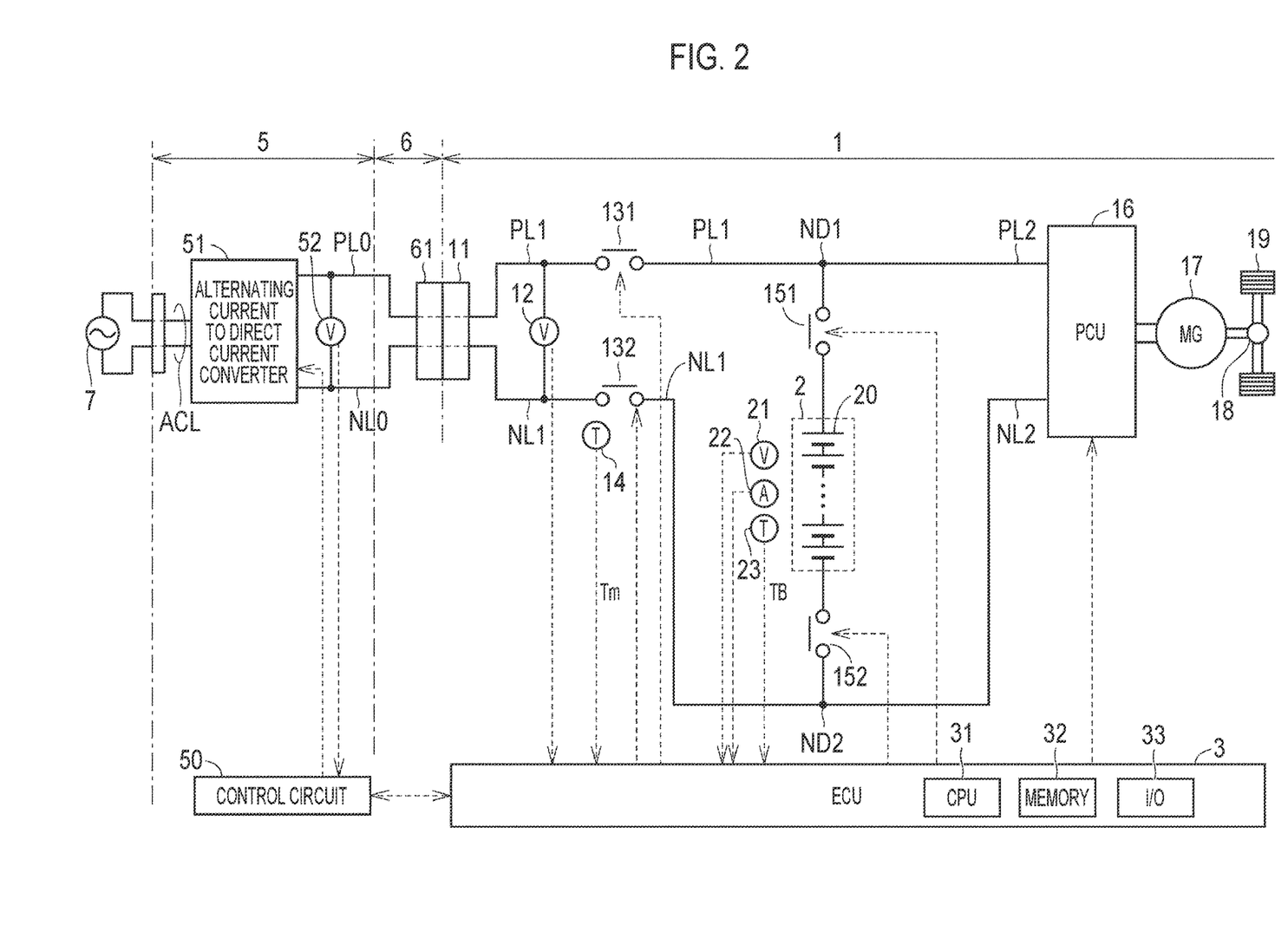
FIG. 2 is a block diagram schematically showing configurations of a vehicle and charging equipment.

FIG. 2 is a block diagram schematically showing configurations of the vehicle 1 and the charging equipment 5. The charging equipment 5 is a direct current (DC) charger (so-called quick charger) corresponding to a charging method of supplying a large amount of electric power (high voltage and large current). The charging equipment 5 converts alternating current power supplied from a system power supply 7 into direct current power for charging a battery 2 mounted in the vehicle 1. The charging equipment 5 includes an electric power line ACL, an alternating current to direct current converter 51, a voltage sensor 52, feeder lines PL0 and NL0, and a control circuit 50.

The electric power line ACL is electrically connected to the system power supply 7. The electric power line ACL transmits the alternating current power from the system power supply 7 to the alternating current to direct current converter 51.

The alternating current to direct current converter 51 converts alternating current power on the electric power line ACL into direct current power for charging the battery 2 mounted in the vehicle 1. The electric power conversion by the alternating current to direct current converter 51 may be executed by a combination of alternating current to direct current conversion for improving a power factor and direct current to direct current conversion for adjusting a voltage level. The direct current power output from the alternating current to direct current converter 51 is supplied by the feeder line PL0 on the positive electrode side and the feeder line NL0 on the negative electrode side.

The voltage sensor 52 is electrically connected between the feeder line PL0 and the feeder line NL0. The voltage sensor 52 detects the voltage between the feeder line PL0 and the feeder line NL0, and outputs the detection result to the control circuit 50.

The control circuit 50 includes a processor such as a central processing unit (CPU), a memory such as a read only memory (ROM) and a random access memory (RAM), and an input and output port (none of which is shown). The control circuit 50 controls the electric power conversion operation by the alternating current to direct current converter 51 based on the voltage detected by the voltage sensor 52, a signal from the vehicle 1, and a map and program stored in the memory.

The vehicle 1 includes an inlet 11, charging lines PL1, NL1, a voltage sensor 12, charging relays 131, 132, a temperature sensor 14, a system main relay (SMR) 151, 152, electric power lines PL2, NL2, a power control unit (PCU) 16, a motor generator 17, a power transmission gear 18, drive wheels 19, the battery 2, a voltage sensor 21, a current sensor 22, a temperature sensor 23, and an electronic control unit (ECU) 3.

The inlet 11 is configured to insert a charging connector 61 of the charging cable 6 with mechanical connection such as fitting. With the insertion of the charging connector 61, the electrical connection between the feeder line PL0 and the contact on the positive electrode side of the inlet 11 is maintained, and the electrical connection between the feeder line NL0 and the contact on the negative electrode side of the inlet 11 is maintained. Further, when the inlet 11 and the charging connector 61 are connected by the charging cable 6, the ECU 3 of the vehicle 1 and the control circuit 50 of the charging equipment 5 can transmit and receive various signals (a command, a request, a message, data, and the like) to and from each other by communication according to a communication standard such as controller area network (CAN).

The voltage sensor 12 is electrically connected between the charging line PL1 and the charging line NL1 closer to the side of the inlet 11 than to the charging relays 131, 132. The voltage sensor 12 detects a direct current voltage between the charging line PL1 and the charging line NL1, and outputs the detection result to the ECU 3.

The charging relay 131 is connected to the charging line PL1, and the charging relay 132 is connected to the charging line NL1. The closing or opening of the charging relays 131, 132 is controlled in response to a command from the ECU 3. When the charging relays 131, 132 are closed and the SMRs 151, 152 are closed, electric power can be transmitted between the inlet 11 and the battery 2.

The temperature sensor 14 is, for example, a thermistor. The temperature sensor 14 detects the temperature of the charging relays 131, 132 (more specifically, the temperature of a relay terminal), and outputs the detection result to the ECU 3. The ECU 3 monitors the temperatures of the charging relays 131, 132 based on the detection result obtained by the temperature sensor 14. Hereinafter, the temperature monitored by the ECU 3 by using the temperature sensor 14 is referred to as a "monitoring temperature Tm". The temperature sensor 14 is an example of the "temperature sensor" according to the present disclosure. The monitoring temperature Tm is an example of the "temperature of an electrical component" according to the present disclosure.

The battery 2 is an assembled battery including a plurality of cells 20. Each of the cells 20 is a secondary battery such as a lithium ion battery or a nickel hydrogen battery. The battery 2 supplies electric power for generating the driving force of the vehicle 1. Further, the battery 2 stores the electric power generated by the motor generator 17. The positive electrode of the battery 2 is electrically connected to a node ND1 via the SMR 151. The node ND1 is electrically connected to the charging line PL1 and the electric power line PL2. In the same manner, the negative electrode of the battery 2 is electrically connected to a node ND2 via the SMR 152. The node ND2 is electrically connected to the charging line NL1 and the electric power line NL2. The closing or opening of SMR 151, 152 is controlled in response to a command from the ECU 3.

The voltage sensor 21 detects a voltage VB of the battery 2. The current sensor 22 detects a current IB input and output to and from the battery 2. The temperature sensor 23 detects a temperature TB of the battery 2. Each of the sensors outputs the detection result to the ECU 3. The ECU 3 can estimate the state of charge (SOC) of the battery 2 based on the detection result obtained by at least one of the voltage sensor 21 or the current sensor 22.

The PCU 16 is electrically connected between the electric power lines PL2, NL2 and the motor generator 17. The PCU 16 includes a converter and an inverter (neither is shown), and drives the motor generator 17 according to a command from the ECU 3.

The motor generator 17 is an alternating current rotary electric machine, for example, a permanent magnet synchronous electric motor including a rotor in which a permanent magnet is embedded. The output torque of the motor generator 17 is transmitted to the drive wheels 19 through the power transmission gear 18 to make the vehicle 1 travel. Further, the motor generator 17 can generate electric power by the rotational force of the drive wheels 19 during the braking operation of the vehicle 1. The electric power generated by the motor generator 17 is converted into the charging electric power of the battery 2 by the PCU 16.

In the same manner as the control circuit 50, the ECU 3 includes a processor 31 such as a CPU, a memory 32 such as a ROM and a RAM, and an input and output port 33. The ECU 3 controls an apparatus and the like, such that the vehicle 1 is in a desired status according to the signals from each of the sensors and the like. The ECU 3 may be configured to be divided into a plurality of ECUs (for example, a charging ECU, a battery ECU, and an MG-ECU) for each function.

Charging Suppression Control

During the quick charging of the battery 2 by the electric power supplied from the charging equipment 5, the temperature of the electrical component electrically connected to the transmission path of the supply electric power can rise due to Joule heat. More specifically, there is a possibility that the temperature of the inlet 11, the charging relays 131, 132, and the like rise excessively. To protect the above-mentioned electrical component, the ECU 3 is configured to execute "charging suppression control". In the charging suppression control, the supply electric power from the charging equipment 5 to the vehicle 1 is suppressed (limited to be small) as compared with the normal time (while the charging suppression control is not executed). In the charging suppression control, a threshold temperature is set with respect to the temperature of the charging relays 131, 132 (the monitoring temperature Tm) as described below.

Figure 3:
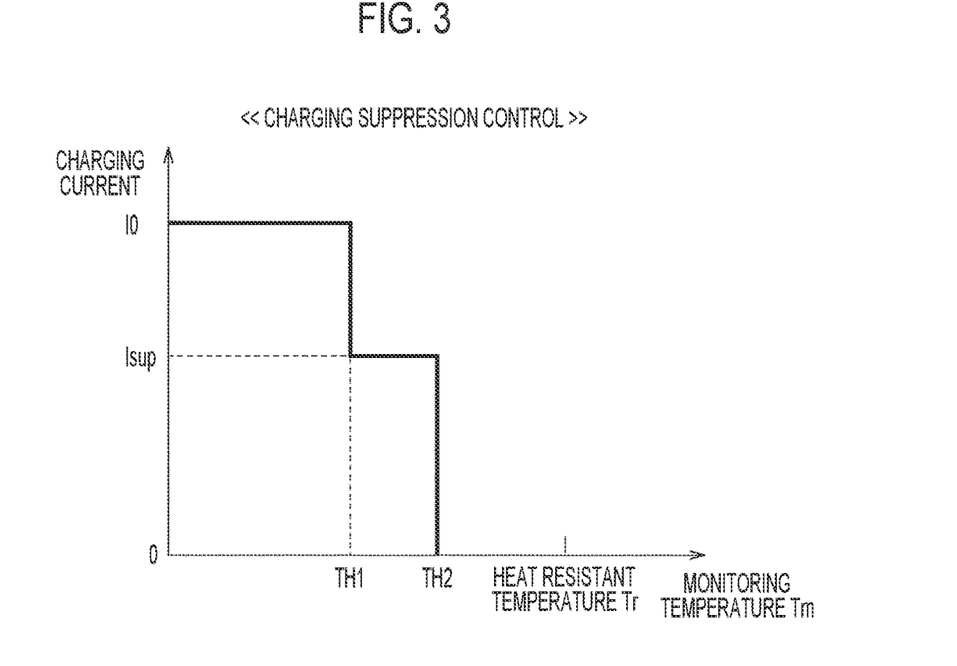
FIG. 3 is a graph showing an example of charging suppression control using a threshold temperature.

FIG. 3 is a graph showing an example of charging suppression control using a threshold temperature. The horizontal axis represents the temperature (monitoring temperature) Tm of the charging relays 131, 132 monitored by using the temperature sensor 14. The vertical axis represents the charging current to the battery 2.

In the example shown in FIG. 3, the monitoring temperature Tm is compared with two threshold temperatures TH1, TH2. The threshold temperature TH1 is lower than the threshold temperature TH2 (TH1<TH2). The threshold temperature TH2 is lower than a heat resistant temperature Tr of the charging relays 131, 132 (TH2<Tr).

When the monitoring temperature Tm is lower than the threshold temperature TH1, the charging current is set to a normal value I0. When the monitoring temperature Tm is equal to or higher than the threshold temperature TH1 and lower than the threshold temperature TH2, the charging current is set to a suppression value Isup smaller than the normal value I0. When the monitoring temperature Tm is equal to or higher than the threshold temperature TH2, the charging current is set to zero. That is, the electric power supply from the charging equipment 5 to the vehicle 1 (the external charging of the vehicle 1) is prohibited.

Temperature Change in Component of Charging Relay

In the system configuration shown in FIG. 2, the temperature of the charging relays 131, 132 is monitored by using the temperature sensor 14. The temperature (the monitoring temperature Tm) is the temperature of the relay terminal. However, the charging relays 131, 132 include other components such as a movable contact in addition to the relay terminal. The temperature of the relay terminal and the temperature of the movable contact may not equal. That is, there may be temperature non-uniformity (a temperature difference between the maximum temperature and the minimum temperature) in the charging relays 131, 132. It is desirable to protect the component other than the relay terminal of which the temperature can be monitored by using the temperature sensor 14 from overheating. Hereinafter, the temperature of a component (for example, the movable contact), for which protection from overheating is needed although the temperature of the component is not monitored because the temperature sensor is not provided, is described as a "non-monitoring temperature Tu".

Figure 4:
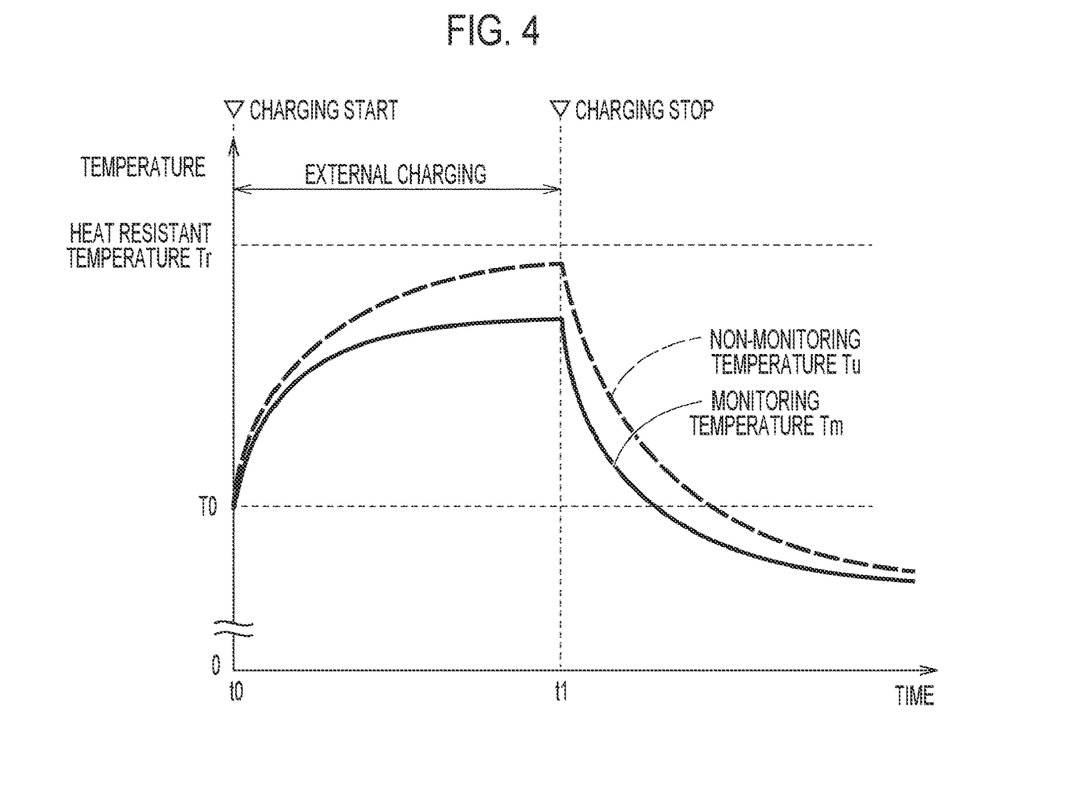
FIG. 4 is a time chart showing an example of a temperature change of a charging relay.

FIG. 4 is a time chart showing an example of temperature changes of the charging relays 131, 132. The horizontal axis represents the elapsed time. The vertical axis represents temperatures (the monitoring temperature Tm, the non-monitoring temperature Tu, and the heat resistant temperature Tr). The same applies to FIGS. 5 and 6 described later.

In a typical charging relay, the relay terminal is exposed to the outside of the housing, while the movable contact is housed inside the housing. Therefore, heat is likely to be dissipated from the relay terminal to the outside, whereas heat is not likely to be dissipated from the movable contact to the outside. Therefore, the temperature of the movable contact (the non-monitoring temperature Tu) is likely to rise while the external charging is executed and is not likely to lower at the time of non-execution (stopping) of the external charging, as compared with the temperature of the relay terminal (the monitoring temperature Tm).

As shown in FIG. 4, when the external charging is started at time t0, the monitoring temperature Tm rises, and the non-monitoring temperature Tu rises while the external charging is executed. The non-monitoring temperature Tu is higher than the monitoring temperature Tm. When the external charging is stopped at time t1, the monitoring temperature Tm lowers, and the non-monitoring temperature Tu lowers. Even during the period, the non-monitoring temperature Tu is higher than the monitoring temperature Tm. However, in the example shown in FIG. 4, since the non-monitoring temperature Tu is always maintained lower than the heat resistant temperature Tr, the failure of the movable contact due to overheating can be prevented.

Setting of Threshold Temperature

In the charging suppression control in the present embodiment, a component such as a movable contact is protected based on the monitoring temperature Tm. To facilitate the understanding of the charging suppression control in the present embodiment, first, the charging suppression control in a comparative example will be described.

Figure 5:
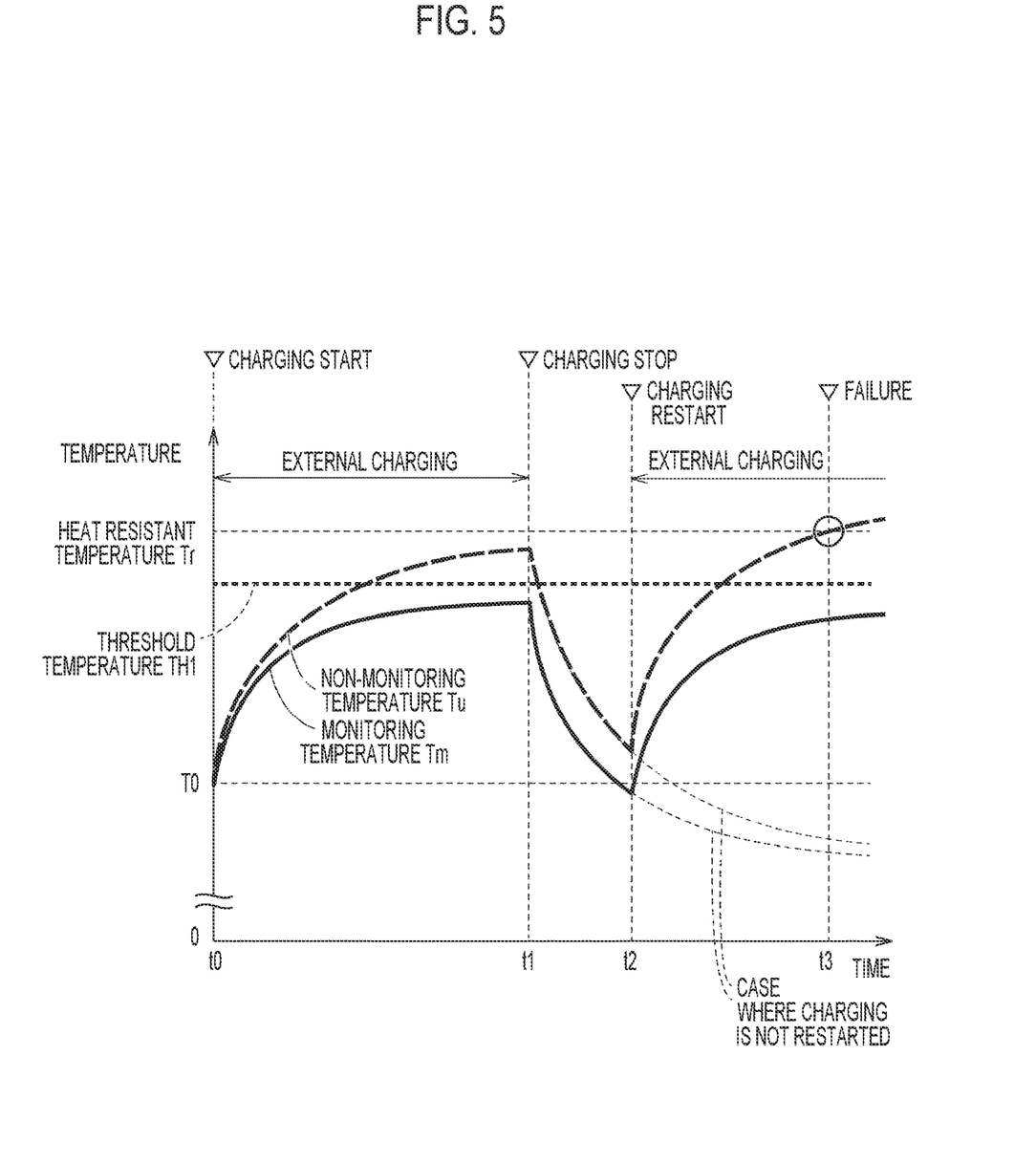
FIG. 5 is a time chart for describing charging suppression control in a comparative example.

FIG. 5 is a time chart for describing the charging suppression control in the comparative example. External charging is started at time t0, and the external charging is executed during the period from time t0 to time t1. During the period, in the example, since the monitoring temperature Tm is lower than the threshold temperature TH1, the supply electric power from the charging equipment 5 to the vehicle 1 is not suppressed. Further, the non-monitoring temperature Tu is lower than the heat resistant temperature Tr, and the movable contact is not overheated.

The external charging is stopped at time t1. Along with the above-mentioned, the monitoring temperature Tm and the non-monitoring temperature Tu lower. However, the external charging is restarted at time t2 before the monitoring temperature Tm and the non-monitoring temperature Tu sufficiently lower. As an example, the vehicle 1 moves from charging equipment installed at one place to charging equipment installed at another place, and the external charging of the vehicle 1 is executed by the charging equipment at the destination. In some embodiments, the vehicle is not moved, and the external charging of the vehicle 1 by the same charging equipment 5 may be executed in two steps.

When the external charging is executed again (hereinafter, also referred to as "restart" of the external charging), the monitoring temperature Tm and the non-monitoring temperature Tu rise again. Since the monitoring temperature Tm is lower than the threshold temperature TH1 even after time t2, the supply electric power from the charging equipment 5 to the vehicle 1 is not suppressed. However, at time t3, the non-monitoring temperature Tu exceeds the heat resistant temperature Tr. In the case, there is a possibility that the movable contact fails due to overheating.

In the comparative example, the threshold temperature TH1 for suppressing the supply electric power from the charging equipment 5 to the vehicle 1 is set to be constant. On the other hand, in the present embodiment, the threshold temperature TH1 is variably set as described below.

Figure 6:
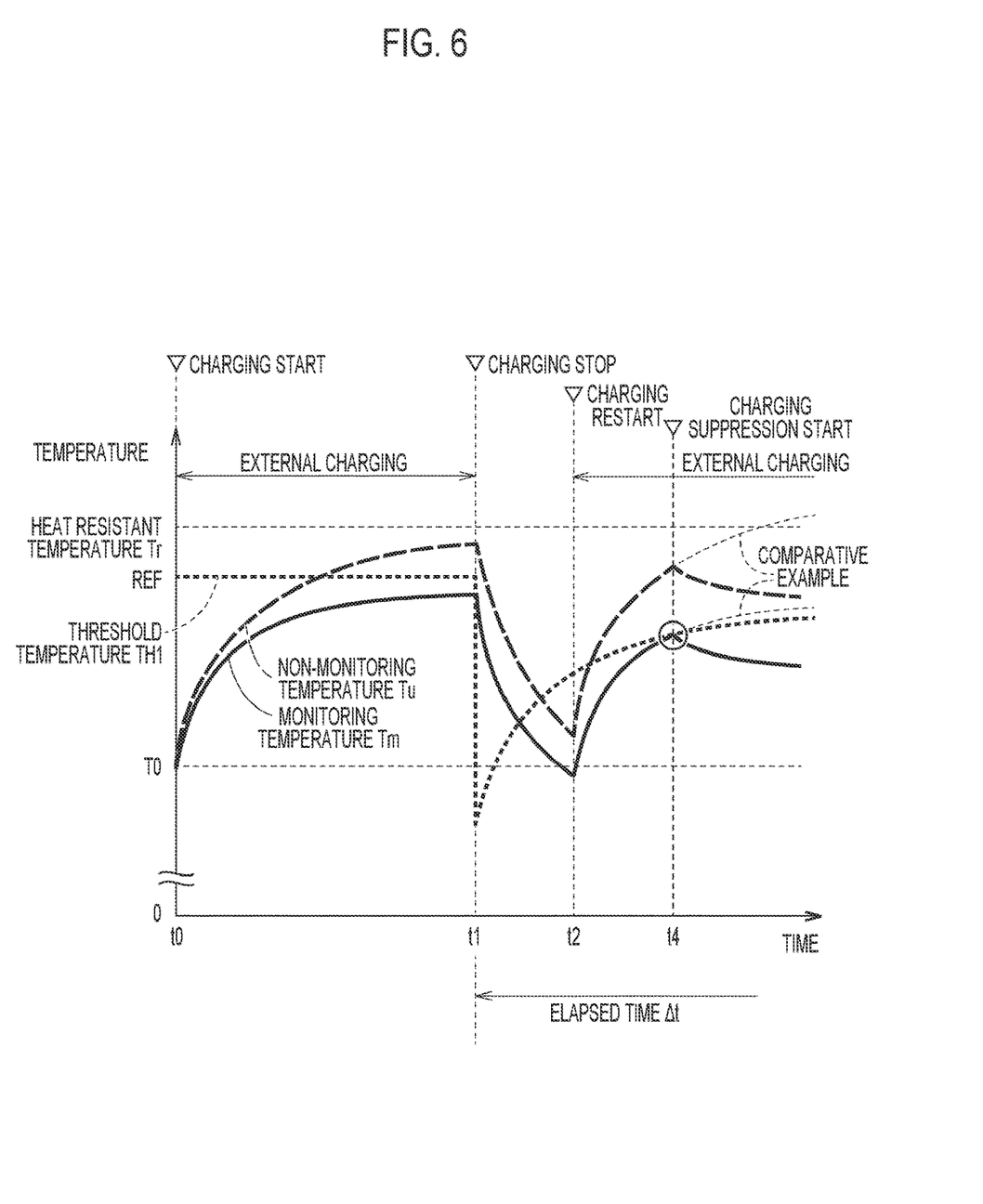
FIG. 6 is a time chart for describing charging suppression control in a present embodiment.

FIG. 6 is a time chart for describing the charging suppression control in the present embodiment. In the present embodiment, at time t1 when the external charging is stopped, the threshold temperature TH1 is significantly reduced as compared with the time before the external charging is stopped. After that, the threshold temperature TH1 gradually increases. In other words, the threshold temperature TH1 rises as time elapses from when the external charging is stopped. Then, at time t4 that is a time after time t2 when the external charging is restarted, the monitoring temperature Tm exceeds the threshold temperature TH1, and the suppression of the supply electric power from the charging equipment 5 to the vehicle 1 is started. Time t4 is the time earlier than time t3 (see FIG. 5) when the non-monitoring temperature Tu exceeds the heat resistant temperature Tr in the comparative example. Therefore, at time t4, the non-monitoring temperature Tu is lower than the heat resistant temperature Tr. Further, as the supply electric power is suppressed, the further rise of the non-monitoring temperature Tu is suppressed after time t4. Therefore, according to the present embodiment, the movable contact can be prevented from a failure due to overheating.

Map

The ECU 3 calculates the threshold temperature TH1 by referring to a map MP stored in the memory 32. Other data formats, such as a data table or a relational expression, may be used instead of a map.

Figure 7A:
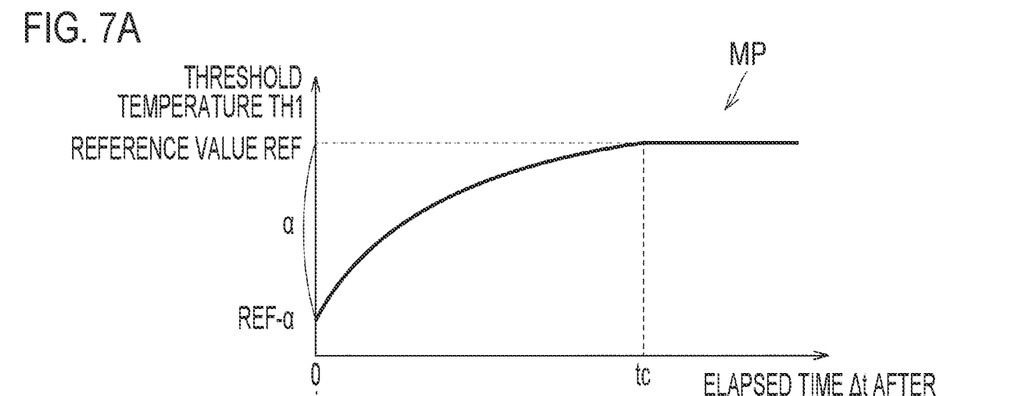
FIG. 7A is a conceptual graph of a map used for setting a threshold temperature.
Figure 7B:
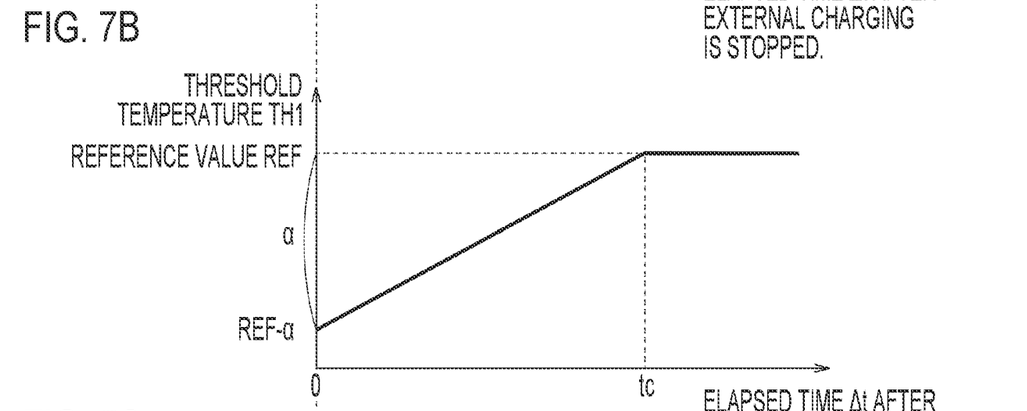
FIG. 7B is a conceptual graph of a map used for setting the threshold temperature.
Figure 7C:
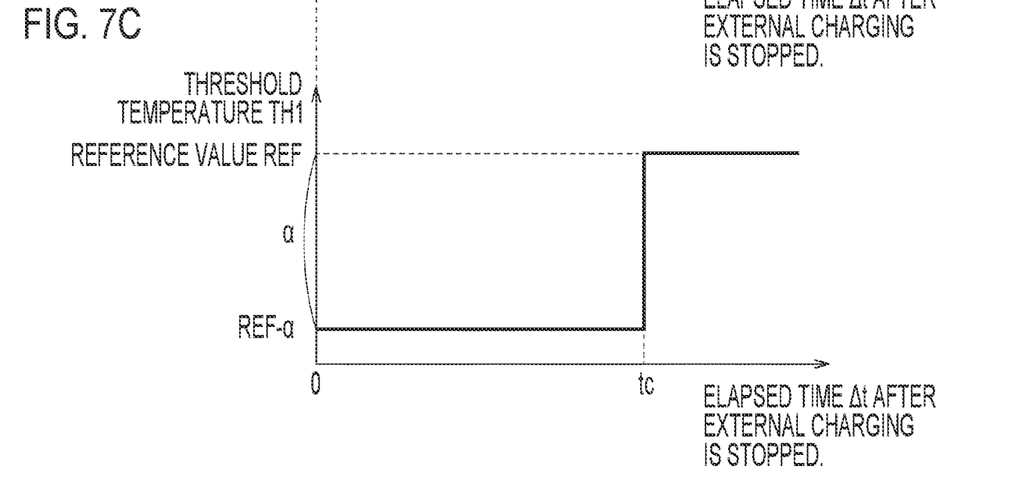
FIG. 7C is a conceptual graph of a map used for setting the threshold temperature.

FIGS. 7A to 7C are conceptual graphs of maps used to set the threshold temperature TH1. In each of FIGS. 7A to 7C, the horizontal axis represents elapsed time Δt after the external charging is stopped. The vertical axis represents the threshold temperature TH1.

As shown in FIG. 7A, the threshold temperature TH1 is reduced by α at the time of the stop of the external charging (when elapsed time Δt is zero) from a reference value REF that is the threshold temperature TH1 before the external charging is stopped. α can be set based on maximum temperature difference that can occur between the temperature of the movable contact and the temperature of the relay terminal. It is desirable to set α larger as the maximum temperature difference is larger (that is, to increase the reduction range of the threshold temperature TH1). The maximum temperature difference can be determined by prior experimentation or simulation.

The threshold temperature TH1 gradually rises with the passage of time. Then, when tc has elapsed from when the external charging is stopped, the threshold temperature TH1 reaches the reference value REF before the external charging is stopped. The period represented by tc is the period during which the temperature difference between the temperature of the movable contact and the temperature of the relay terminal when the external charging is stopped is eliminated (in other words, thermal equilibrium), and is set by experimentation or simulation. After that, the threshold temperature TH1 is maintained at the reference value REF.

While the external charging is executed, the supply electric power from the charging equipment (charging current) is generally controlled to be gradually reduced to zero prior to the time when the external charging is stopped. Therefore, instead of using the time when the external charging is stopped (the time when supply electric power=0) as the reference on the horizontal axis, the reference may be set based on the time when the supply electric power (charging current) from the charging equipment 5 to the vehicle 1 falls below a predetermined value larger than zero. That is, the threshold temperature TH1 may be raised as time elapses from when the supply electric power falls below the predetermined value.

Further, FIG. 7A shows an example in which the threshold temperature TH1 rises continuously and in a curve. However, the method of setting the threshold temperature TH1 is not limited thereto. The threshold temperature TH1 may be set to rise continuously and linearly (see FIG. 7B). The threshold temperature TH1 may be set to rise discontinuously and incrementally (stepwise) (see FIG. 7C). Although not shown, the threshold temperature TH1 may be divided into three or more stages to gradually rise.

Processing Flow

Figure 8:
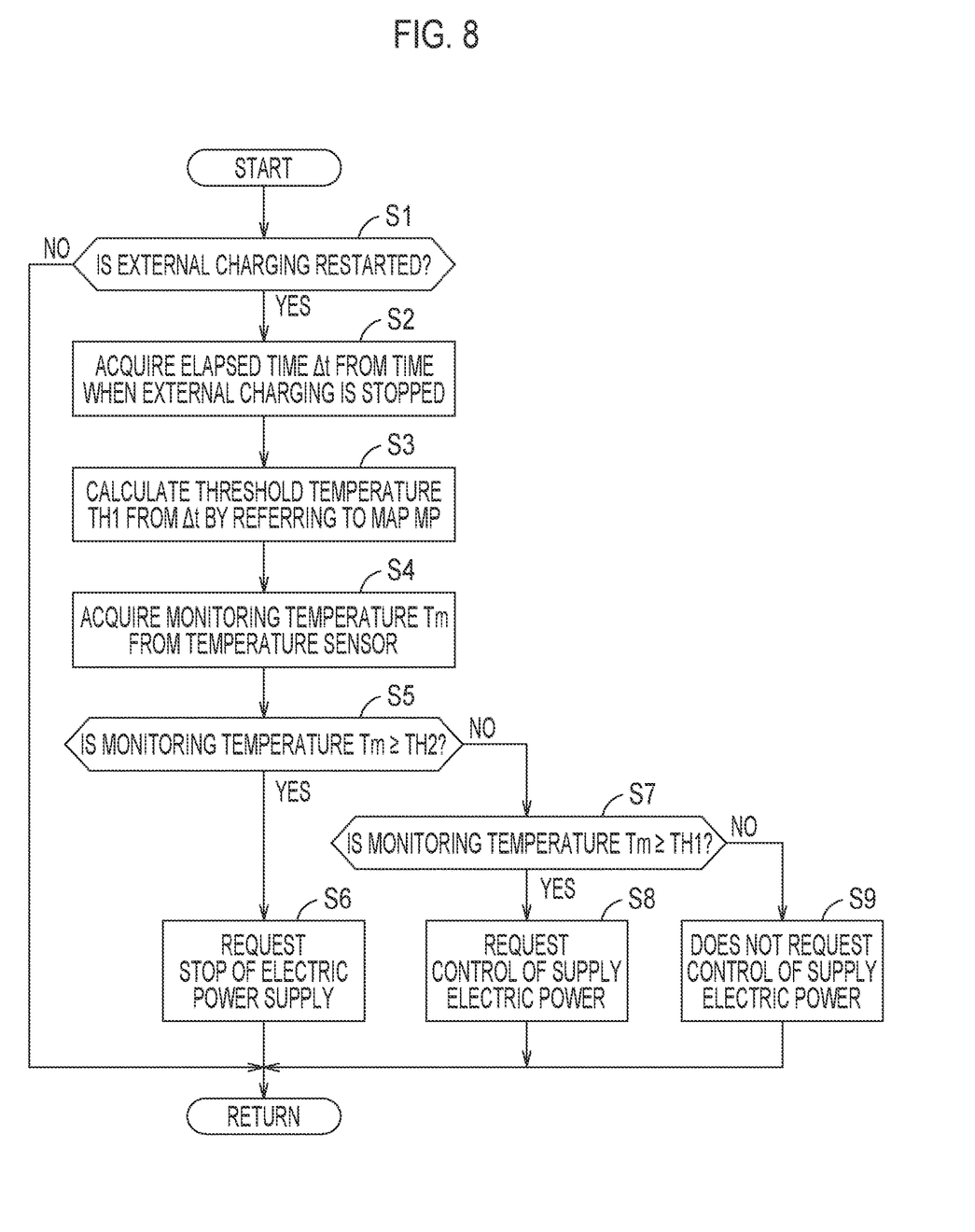
FIG. 8 is a flowchart showing a processing procedure of the charging suppression control in the present embodiment.

FIG. 8 is a flowchart showing a processing procedure of the charging suppression control in the present embodiment. The flowchart is called from a main routine and executed when a predetermined condition is satisfied during the external charging (for example, every predetermined cycle). Each step is realized by software processing by the ECU 3, but may be realized by hardware (electric circuit) disposed in the ECU 3. Hereinafter, step is abbreviated as S.

In S1, the ECU 3 determines whether the external charging is restarted (executed again). Processing is returned to the main routine until the external charging is restarted (NO in S1). When the external charging is restarted (YES in S1), the ECU 3 acquires elapsed time Δt from when the external charging is stopped by using a timer (not shown) of the ECU 3 (S2). The ECU 3 calculates the threshold temperature TH1 from the elapsed time Δt acquired in S2 by referring to the map MP (see FIGS. 7A to 7C) (S3).

In S4, the ECU 3 acquires the monitoring temperature Tm from the temperature sensor 14. Then, the ECU 3 determines whether the monitoring temperature Tm is equal to or higher than the threshold temperature TH2 (S5). In contrary to the threshold temperature TH1, the threshold temperature TH2 is set to a fixed value (a value between the reference value REF of the threshold temperature TH1 and the heat resistant temperature Tr). When the monitoring temperature Tm is equal to or higher than the threshold temperature TH2 (YES in S5), the ECU 3 requests the control circuit 50 of the charging equipment 5 to completely stop the electric power supply from the charging equipment 5 to the vehicle 1 (S6).

When the monitoring temperature Tm is lower than the threshold temperature TH2 (NO in S5), the ECU 3 advances processing to S7 and determines whether the monitoring temperature Tm is equal to or higher than the threshold temperature TH1. When the monitoring temperature Tm is equal to or higher than the threshold temperature TH1 (YES in S7), that is, when the monitoring temperature Tm is equal to or higher than the threshold temperature TH1 and lower than the threshold temperature TH2, the ECU 3 requests the control circuit 50 of the charging equipment 5 to suppress the supply electric power from the charging equipment 5 to the vehicle 1 (S8).

When the monitoring temperature Tm is lower than the threshold temperature TH1 (NO in S7), the ECU 3 does not request the suppression of the supply electric power from the charging equipment 5 to the vehicle 1 (S9). In the case, the electric power supply is performed as usual.

As described above, in the present embodiment, the threshold temperature TH1 is reduced while the external charging is stopped as compared with a period before the external charging is stopped. As a result, when the external charging is restarted after the external charging is stopped, the time until the temperature (the monitoring temperature Tm) of the relay terminal monitored by the temperature sensor 14 among the charging relays 131, 132 reaches the threshold temperature TH1 is shortened. Then, the supply electric power from the charging equipment 5 to the vehicle 1 is suppressed at an early stage. As a result, the further rise in the temperature of the movable contact that is not a monitoring target (the non-monitoring temperature Tu) is suppressed. Therefore, according to the present embodiment, all of the charging relays 131, 132 including the movable contact can be protected from overheating.

In the present embodiment, the charging relays 131, 132 are examples of the "electrical component" according to the present disclosure. However, the "electrical component" according to the present disclosure is not limited thereto, and may be the inlet 11. Also in the inlet 11, a temperature difference is likely to occur between the electric power terminal and a component such as a cable disposed inside the housing so that the charging suppression control in the present embodiment is useful.

In the present embodiment, an example in which the charging equipment 5 is a quick charger has been described. In general, since the supply electric power by alternating current (AC) charging is smaller than the supply electric power by direct current charging, overheating of a part is less likely to be a problem in alternating current charging. However, the ECU 3 may execute the charging suppression control according to the present embodiment during the external charging using the charging equipment 5 (so-called ordinary charger) that supplies alternating current electric power.

Further, the charging suppression control in the present embodiment can be applied during plug-in charging of the vehicle 1 as well as during non-contact charging of the vehicle 1. Although not shown, during non-contact charging of the vehicle 1, electric power is transmitted in a non-contact manner from a power transmission device embedded in a road surface and the like to an in-vehicle power receiving device (power receiving coil and the like). In the case, the "electrical component" according to the present disclosure may be a charging relay or may be a power receiving device.

The embodiments disclosed in the present disclosure should be considered to be exemplary and not restrictive in any respects. The scope of the present disclosure is set forth by the claims rather than the description of the embodiments, and is intended to include all modifications within the meaning and scope of the claims.

What is claimed is:

1. A vehicle configured to execute external charging that charges an in-vehicle power storage device with supply electric power from charging equipment, the vehicle comprising:
    an electrical component electrically connected to a transmission path of the supply electric power;
    a temperature sensor configured to detect a temperature of the electrical component; and
    a control device configured to suppress the supply electric power when the temperature detected by the temperature sensor is equal to or higher than a threshold temperature, as compared with a case where the temperature detected by the temperature sensor is lower than the threshold temperature,
    wherein the control device is configured to lower the threshold temperature when the external charging is executed again after the external charging is stopped, as compared with a case before the external charging is stopped.

2. The vehicle according to claim 1, wherein the control device is configured to raise the threshold temperature until the threshold temperature reaches a value before the stop of the external charging after lowering the threshold temperature.

3. The vehicle according to claim 2, wherein the control device is configured to raise the threshold temperature as time elapses after the supply electric power falls below a predetermined value.

4. The vehicle according to claim 3, wherein the control device is configured to raise the threshold temperature as time elapses from when the external charging is stopped.

5. The vehicle according to claim 1, wherein as a temperature difference between the temperature detected by the temperature sensor and a temperature of a portion of the electrical component, which is not detected by the temperature sensor, becomes larger, a lowering amount of the threshold temperature at the time when the external charging is stopped becomes larger.

6. The vehicle according to claim 1, wherein the electrical component includes charging relays configured to cut off the supply electric power according to a command by the control device.

7. The vehicle according to claim 1, wherein the electrical component includes an inlet to which a charging cable extending from the charging equipment is connected.

8. A charging method of a vehicle, the vehicle being configured to execute external charging of an in-vehicle power storage device with supply electric power from charging equipment and including a control device, the charging method comprising:
    as a detection step, detecting, by the control device, a temperature of an electrical component electrically connected to a transmission path of the supply electric power in the vehicle;
    suppressing, by the control device, the supply electric power when the temperature detected in the detection step exceeds a threshold temperature, as compared with a case where the temperature detected in the detection step is lower than the threshold temperature; and
    lowering, by the control device, the threshold temperature by the control device when the external charging is executed again after the external charging is stopped, as compared with a case before the external charging is stopped.

* * * * *